United States Patent
Yu et al.

(10) Patent No.: US 8,463,248 B2
(45) Date of Patent: Jun. 11, 2013

(54) METHOD FOR TRANSMITTING DATA RELATED TO BROADCASTING CONTENTS, AND MOBILE TERMINAL USING THE SAME

(75) Inventors: Youngjin Yu, Seoul (KR); Changyoung Park, Seoul (KR); Kwangsik Kong, Seoul (KR)

(73) Assignee: LG Electronics Inc., Seoul (KR)

( * ) Notice: Subject to any disclaimer, the term of this patent is extended or adjusted under 35 U.S.C. 154(b) by 295 days.

(21) Appl. No.: 12/796,590

(22) Filed: Jun. 8, 2010

(65) Prior Publication Data
US 2010/0311446 A1 Dec. 9, 2010

(30) Foreign Application Priority Data
Jun. 8, 2009 (KR) .................... 10-2009-0050278

(51) Int. Cl.
*H04M 3/42* (2006.01)
(52) U.S. Cl.
USPC .............. 455/414.1; 455/412.1; 455/566; 455/550.1; 725/87; 725/98; 715/203; 715/751
(58) Field of Classification Search
USPC .............. 455/466, 412.1, 414.1; 709/203, 709/208, 227, 238; 725/62; 370/312
See application file for complete search history.

(56) References Cited

U.S. PATENT DOCUMENTS

| 2002/0056123 A1* | 5/2002 | Liwerant et al. ................ 725/87 |
| 2009/0049118 A1 | 2/2009 | Stevens |
| 2010/0241691 A1* | 9/2010 | Savitzky et al. ............. 709/203 |

FOREIGN PATENT DOCUMENTS

| CN | 1925598 | 3/2007 |
| KR | 1020070070865 | 7/2007 |
| WO | 2007021316 | 2/2007 |

OTHER PUBLICATIONS

The State Intellectual Property Office of the People's Republic of China Application Serial No. 201010240309.X, Office Action dated Jan. 24, 2013, 10 pages.

* cited by examiner

*Primary Examiner* — Kathy Wang-Hurst
(74) *Attorney, Agent, or Firm* — Lee, Hong, Degerman, Kang & Waimey

(57) ABSTRACT

A method for transmitting a data related to broadcasting contents and a mobile terminal using the same are disclosed, wherein the method includes displaying the broadcasting contents on a display unit by receiving and executing the broadcasting contents through an external server; obtaining access information of the broadcasting contents; generating the text message including the access information; and transmitting said text message to the other terminal.

14 Claims, 15 Drawing Sheets

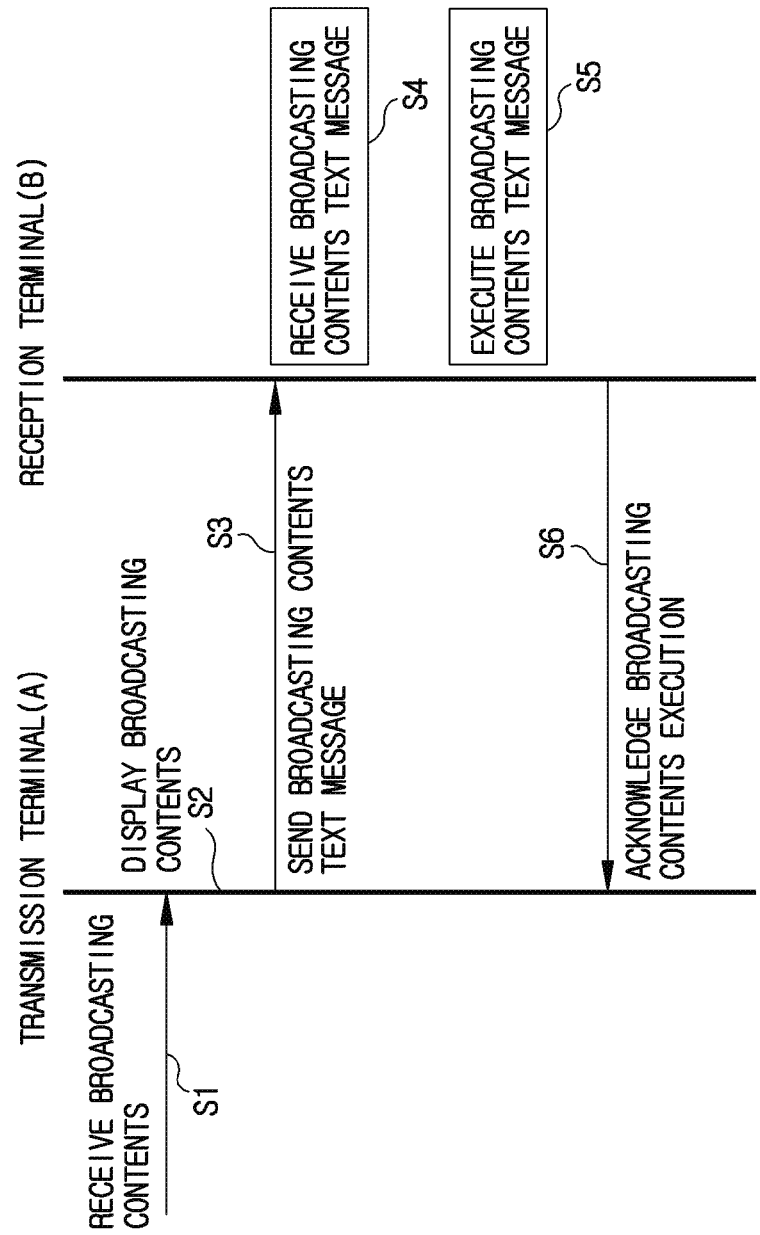

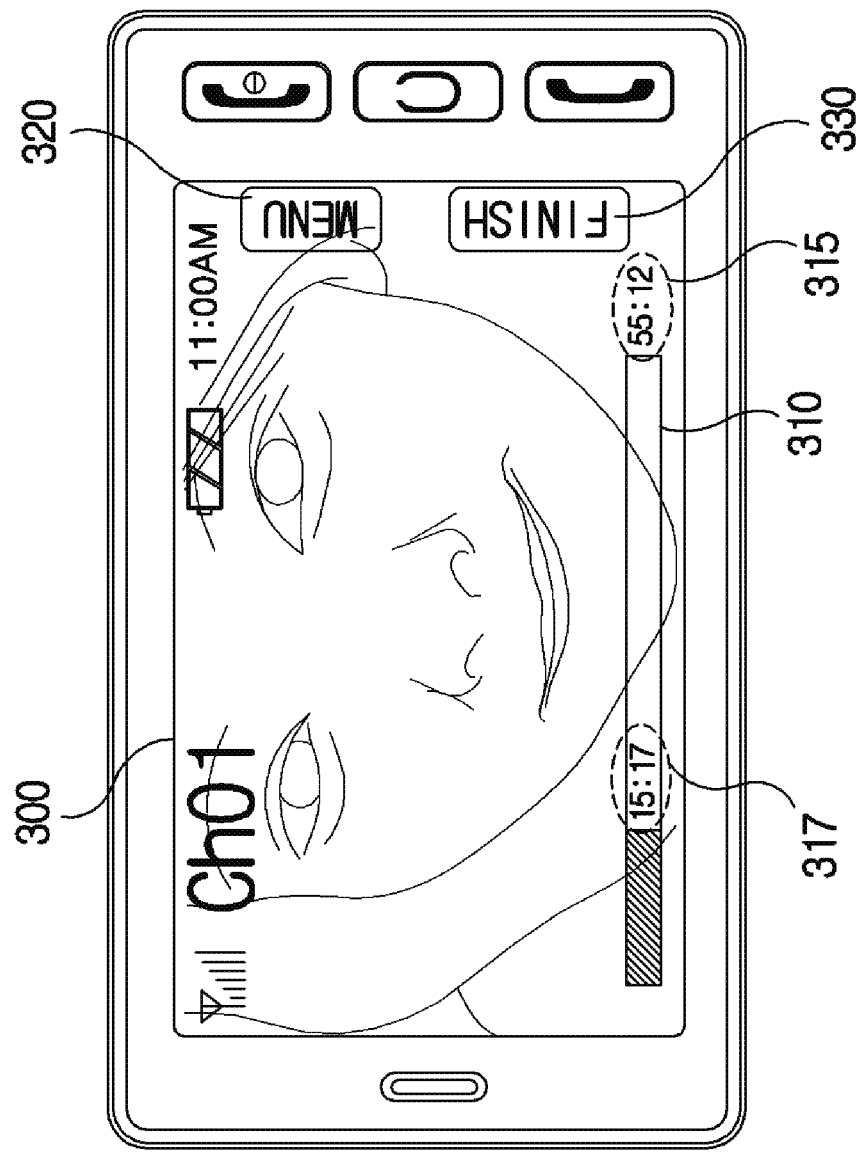

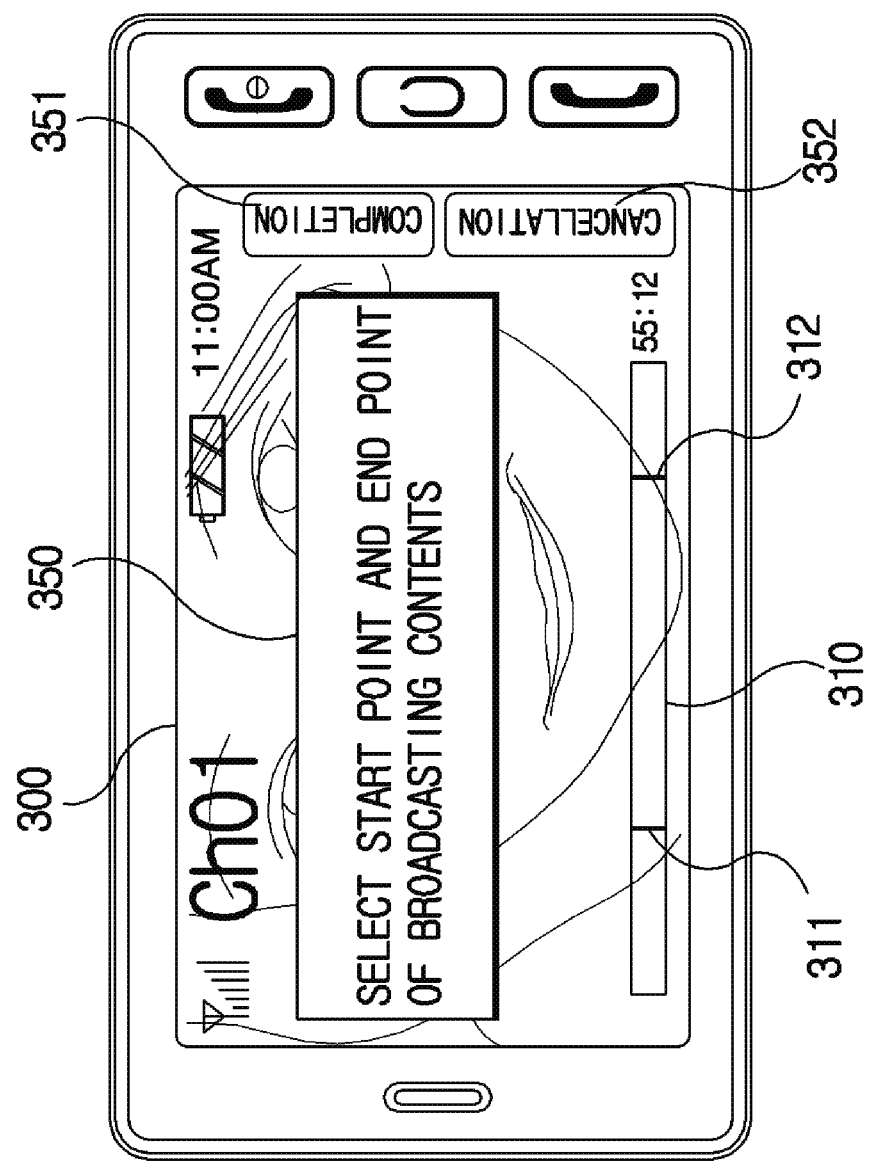

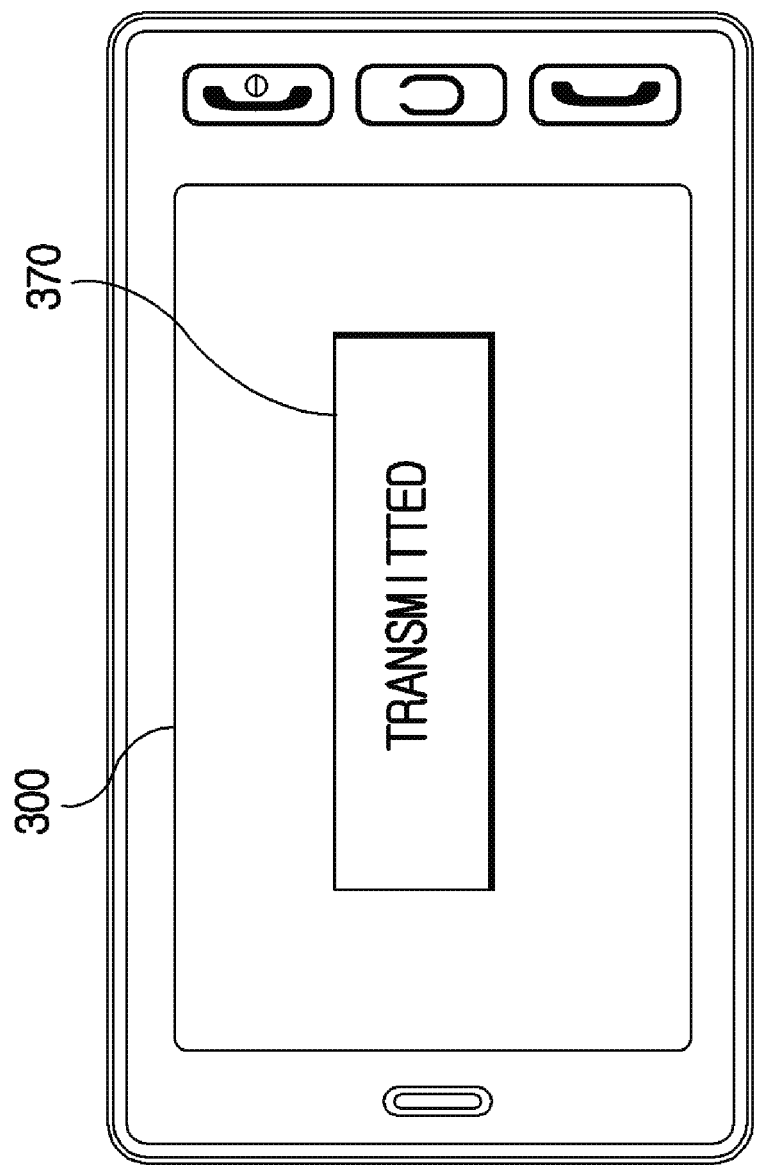

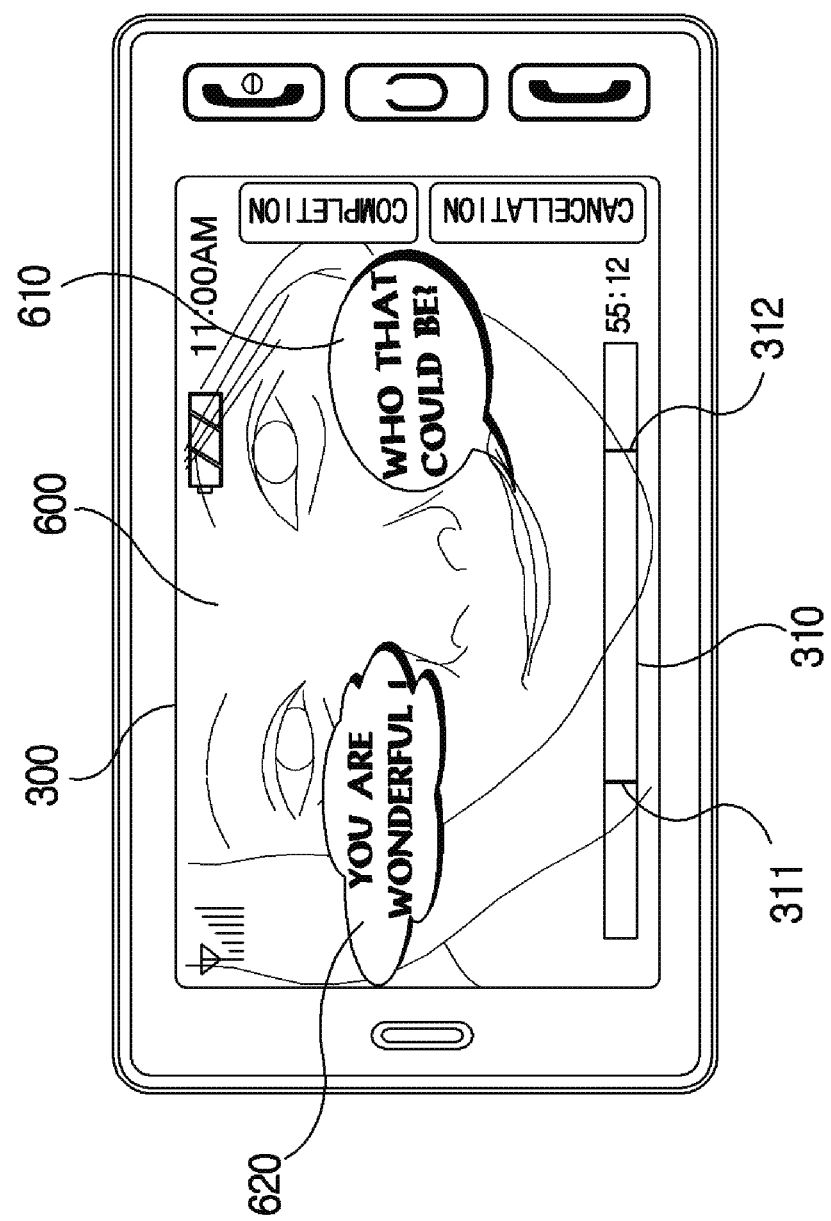

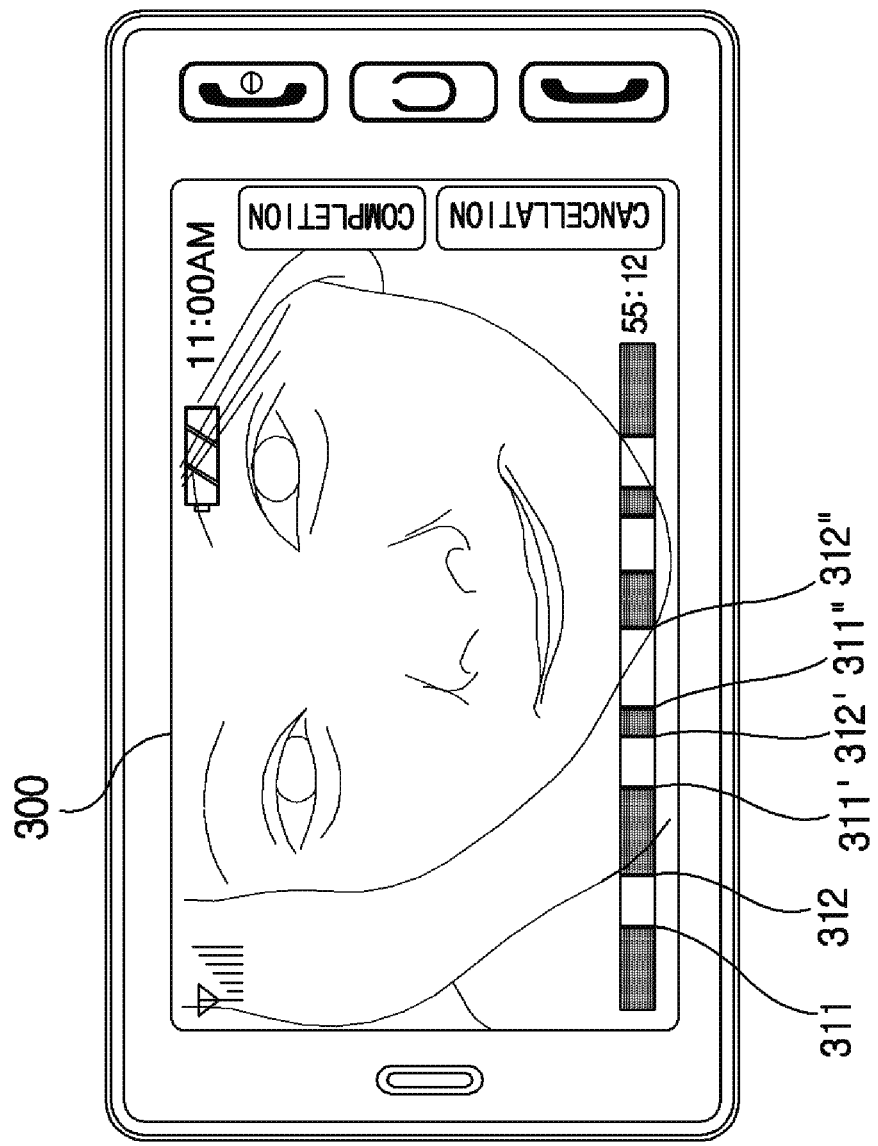

METHOD FOR TRANSMITTING DATA RELATED TO BROADCASTING CONTENTS, AND MOBILE TERMINAL USING THE SAME

Pursuant to 35 U.S.C. §119(a), this application claims the benefit of earlier filing date and right of priority to Korean Patent Application No. 10-2009-0050278, filed on Jun. 8, 2009, the contents of which are hereby incorporated by reference in their entirety.

BACKGROUND OF THE DISCLOSURE

1. Field

The present disclosure relates to a method for transmitting data related to broadcasting contents and a mobile terminal using the same.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To implement the complex functions in the multimedia player, improvement of structural parts and/or software parts of the terminal may be considered in various attempts. Concomitant with development of Internet, a moving image can be viewed through a mobile terminal. Such Internet moving image may be an IPTV (Internet Protocol Television), for example.

Furthermore, an MMS (Multimedia Message Service) sending a message by attaching a moving image or an audio file through the mobile terminal is also possible.

SUMMARY OF THE DISCLOSURE

The present disclosure is to provide a method for transmitting data related to broadcasting contents configured to edit broadcasting contents stored in an external server, and to allow a mobile terminal of an opposition party to view the edited broadcasting contents, and a mobile terminal using the same.

In one general aspect of the present disclosure, a method for transmitting a data related to broadcasting contents, the method comprises displaying the broadcasting contents on a display unit by receiving and executing the broadcasting contents through an external server; obtaining access information of the broadcasting contents; generating the text message including the access information; and transmitting said text message to the other terminal.

In some exemplary embodiments of the present disclosure, the method further comprises displaying the progressive bar determining replay time of the broadcasting contents on a display; and generating a replay time information of the broadcasting contents by receiving a determined command inputted to the progressive bar, wherein the step of generating the text message including access information includes generating the text message further including said replay time information.

In some exemplary embodiments of the present disclosure, the step of generating a replay time information of the broadcasting contents by receiving a determined command inputted to the progressive bar includes generating a plurality of replay time information of the broadcasting contents according to a plurality of a determined command inputted on the progressive bar.

In some exemplary embodiments of the present disclosure, the access information includes an IP address of an external server and intrinsic ID information of broadcasting contents.

In some exemplary embodiments of the present disclosure, the method further comprises receiving a replay stop command of the broadcasting contents; displaying at least one of external input characters on a halted screen by receiving a determined command of generating a character through a touch screen or a keypad; and generating resolution information about at least one of external input characters by way of capturing a halted screen, wherein the step of generating the text message including access information includes generating the text message further including said the resolution information.

In another general aspect of the present disclosure, A method for displaying a data related to broadcasting contents, the method comprises receiving a text message including access information of broadcasting contents; receiving the broadcasting contents by way of accessing the external server using said access information; and displaying the broadcasting contents on the display unit by executing the broadcasting contents.

In some exemplary embodiments of the present disclosure, the text message further includes a replay time information of the broadcasting contents, and wherein the step of displaying the broadcasting contents on the display unit by executing the broadcasting contents includes displaying the broadcasting contests on the display unit according to said replay time information.

In some exemplary embodiments of the present disclosure, the text message further includes the resolution information about at least one of external input characters by way of capturing a halted screen, and wherein the step of displaying the broadcasting contents on the display unit by executing the broadcasting contents includes displaying the broadcasting contests including at least one of external input characters on the display unit according to resolution information.

In another general aspect of the present disclosure, a mobile terminal comprises a wireless communication unit having a wireless Internet module and a mobile communication module, wherein the wireless Internet module is configured to access an external server, and the mobile communication module is configured to transmit a text message; a display unit configured to display broadcasting contents; and a controller configured to generate a text message including the access information of the broadcasting content and transmit said text message to the other terminal.

In some exemplary embodiments of the present disclosure, the controller displays the progressive bar determining replay time of the broadcasting contents, and generates a replay time information of the broadcasting contents by receiving a determined command inputted to the progressive bar and a text message further including the access information.

In some exemplary embodiments of the present disclosure, the controller displays generates at least one of external input characters on a halted screen by receiving a determined command of generating characters through the touch screen or the keypad, and generates the resolution information about at least one of external input characters by way of capturing a halted screen.

In another general aspect of the present disclosure, a mobile terminal comprises a wireless communication unit having a wireless Internet module and a mobile communication module, wherein the wireless Internet module is configured to access an external server, and the mobile communication module is configured to receive a text message including the access information of the broadcasting content from the other terminal; a display unit configured to display a broadcasting contents; and a controller configured to receive the broadcasting contents by way of accessing the external server using said access information, and replays the broadcasting contents.

In some exemplary embodiments of the present disclosure, the text message further includes a replay time information, and wherein the controller replays the broadcasting contents according to the replay time information.

In some exemplary embodiments of the present disclosure, the text message further includes the resolution information about at least one of external input characters obtained by way of capturing a halted screen, and wherein the controller replays the broadcasting contents including an at least one of external input characters according to the resolution information.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 2b is a perspective diagram of a backside of the mobile terminal shown in FIG. 2a;

FIG. 3 is an overall flowchart illustrating a method for transmitting a data related to broadcasting contents of an external server and a method for displaying broadcasting contents according to an exemplary embodiment of the present disclosure;

FIGS. 6a-6f are an image view of a mobile terminal illustrating a method for transmitting a data related to broadcasting contents of an external sever according to an exemplary embodiment of the present disclosure;

FIG. 7 is an image view of a mobile terminal applied with a method for transmitting a data related to broadcasting contents of an external sever according to another exemplary embodiment of the present disclosure;

FIG. 8 is an image view of a mobile terminal applied with a method for transmitting a data related to broadcasting contents of an external sever according to still another exemplary embodiment of the present disclosure.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals such as stationary terminals that include digital TVs and desktop computers, the details of which are well known to the persons in the art.

Figure 1:
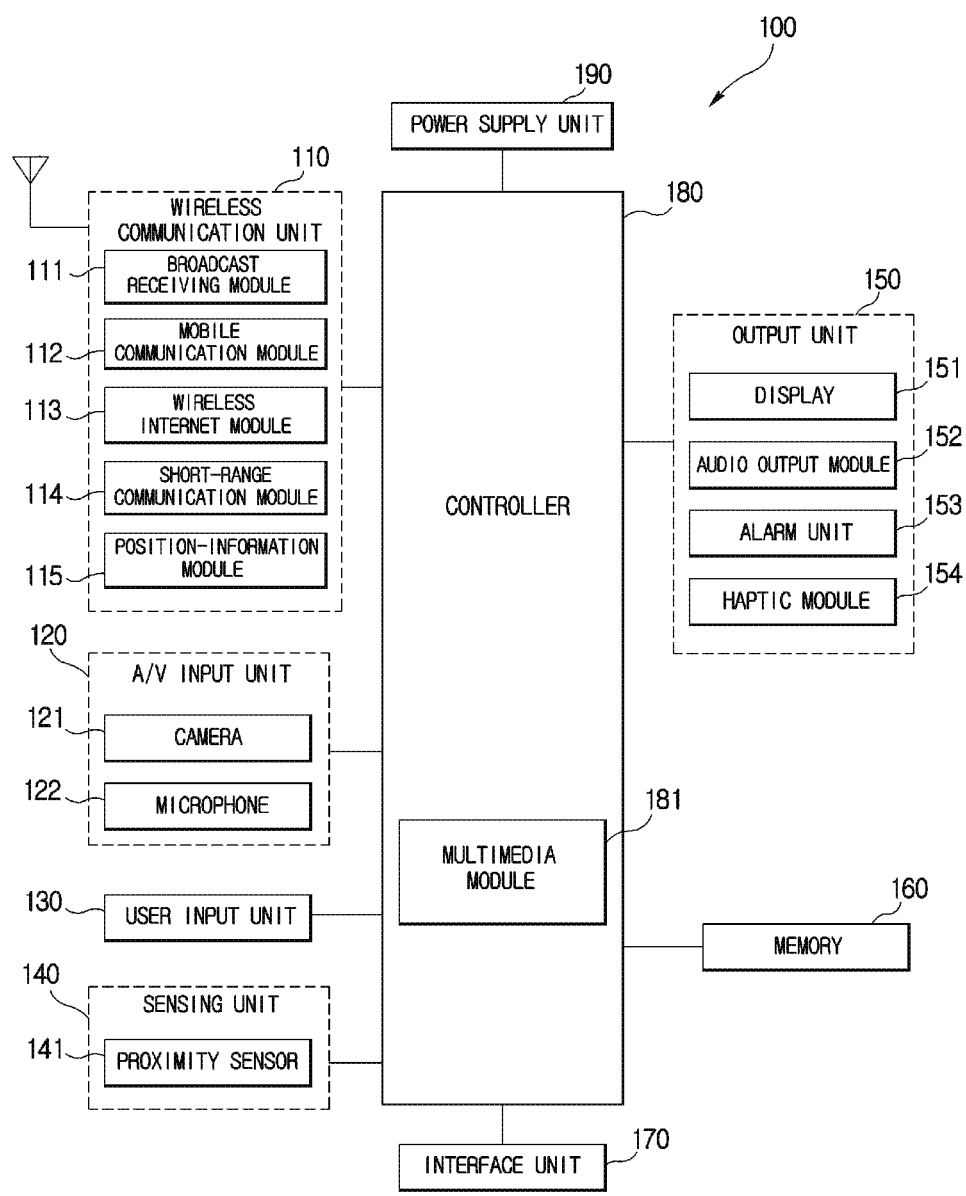
FIG. 1 is a block diagram of a mobile terminal according to an exemplary embodiment of the present disclosure.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply unit 190.

The constituent elements shown in FIG. 1 are not essential, such that other mobile terminals may be implemented with fewer elements or more elements than are shown in FIG. 1. Now, the constituent elements will be described in detail.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as Bluetooth and ZigBee.

The position-location module 115 may identify or otherwise obtain a location of the mobile terminal 100. The position-location module 115 may be provided using global positioning system (GPS) components that cooperate with associated satellites, network components, and/or combinations thereof.

Referring to FIG. 1, the audio/video (A/V) input unit 120 may provide audio or video signal input to the mobile terminal 100. The A/V input unit 120 may include a camera 121 and a microphone 122. The camera 121 may receive and process image frames of still pictures and/or video. The processed image frames of still pictures and/or video may be displayed on a display 151.

The image frames processed by the camera 121 may be stored in the memory 160 or may be transmitted to the outside via the wireless communication unit 110. Two or more cameras may be provided according to use environment.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is open or closed. The sensing unit 140 may also sense presence or absence of power provided by the power supply unit 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm unit 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmissive type configuration to enable an external environment to be seen through. This may be called a transparent display. A transparent OLED (TOLED) may be an example of a transparent display. A backside structure of the display 151 may also have the light-transmissive type configuration. In this configuration, a user may see an object located behind the terminal body through the area occupied by the display 151 of the terminal body.

At least two or more displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereinafter a touch sensor) are constructed in a mutual-layered structure (hereinafter a touch screen), the display 151 may be used as an input device as well as an output device. For example, the touch sensor 142 may include a touch film, a touch sheet, a touchpad and/or the like.

The touch sensor 142 may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor 142, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touch-screen or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touch screen is an electrostatic type, the proximity sensor 141 may detect proximity of a pointer using a variation of an electric field according to the proximity of the pointer. In this case, the touch screen (touch sensor) may be classified into the proximity sensor.

An action in which a pointer approaches the touch screen without contacting the touch screen may be called a proximity touch. An action in which a pointer actually touches the touch screen may be called a contact touch. The location of the touch screen proximity-touched by the pointer may be the position of the pointer that vertically opposes the touch screen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touch screen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm unit 153 may output a signal for announcing an event occurrence of the mobile terminal 100. An event occurring in the mobile terminal 100 may include one of a call signal reception, a message reception, a key signal input, a touch input and/or the like. The alarm unit 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm unit 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touch screen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touch screen as a character an/or recognizing a picture drawing input performed on the touch screen as an image.

The power supply unit 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
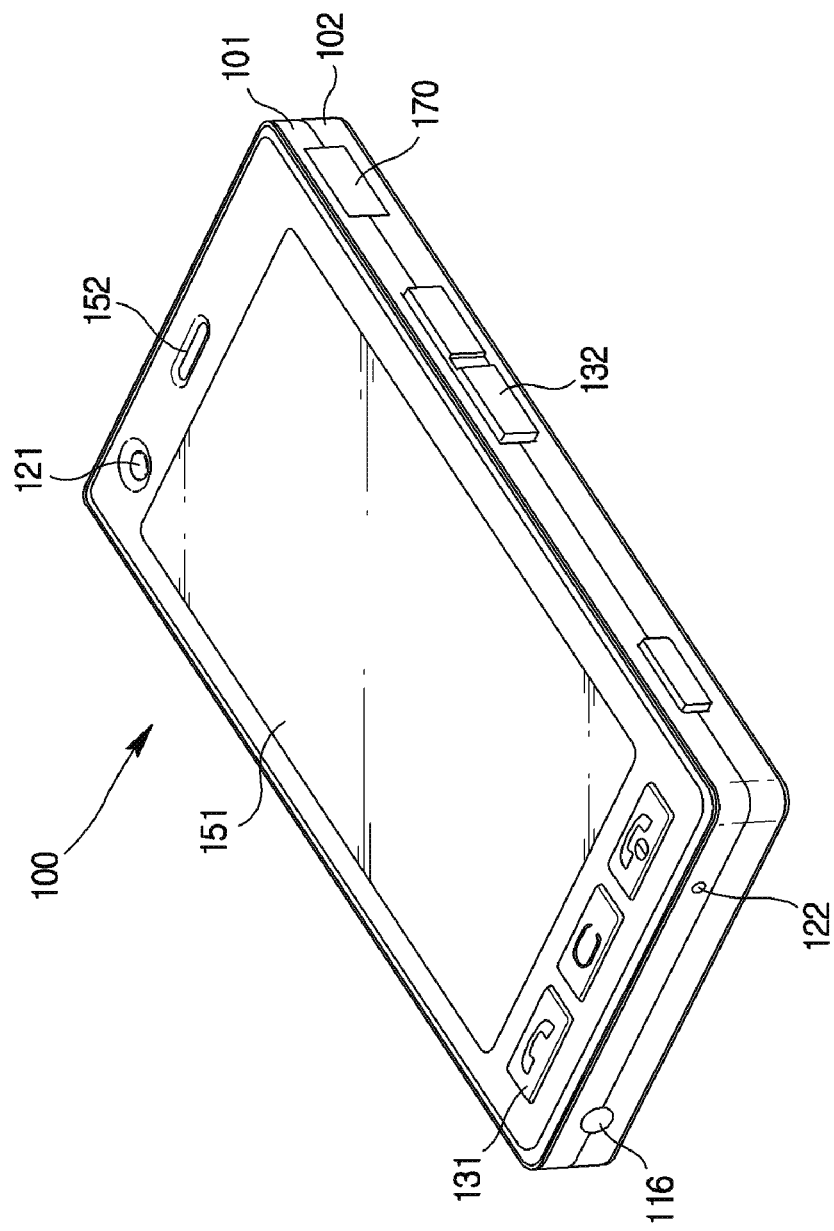
FIG. 2a is a front-view of a mobile terminal according to an example embodiment.

FIG. 2*a* is a front-view of a mobile terminal according to an example embodiment. Other embodiments, configurations and arrangements may also be provided.

As shown in FIG. 2*a*, the mobile terminal 100 may include a bar type terminal body. Embodiments of the mobile terminal may be implemented in a variety of different configurations. Examples of such configuration may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of metal substance such as stainless steel (STS), titanium (Ti) or the like, for example.

The display 151, the audio output unit 152, the camera 121, user input units 130/131/132, the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The user input unit 130 may receive a command for controlling an operation of the mobile terminal 100. The user input unit 130 may include a plurality of manipulating units 131 and 132. The manipulating units 131 and 132 may be called a manipulating portion and may adopt any mechanism of a tactile manner that enables a user to perform a manipulation action by experiencing a tactile feeling.

Contents inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for switching to a touch recognizing mode of the display 151 or the like may be inputted to the second manipulating unit 132.

Figure 2B:
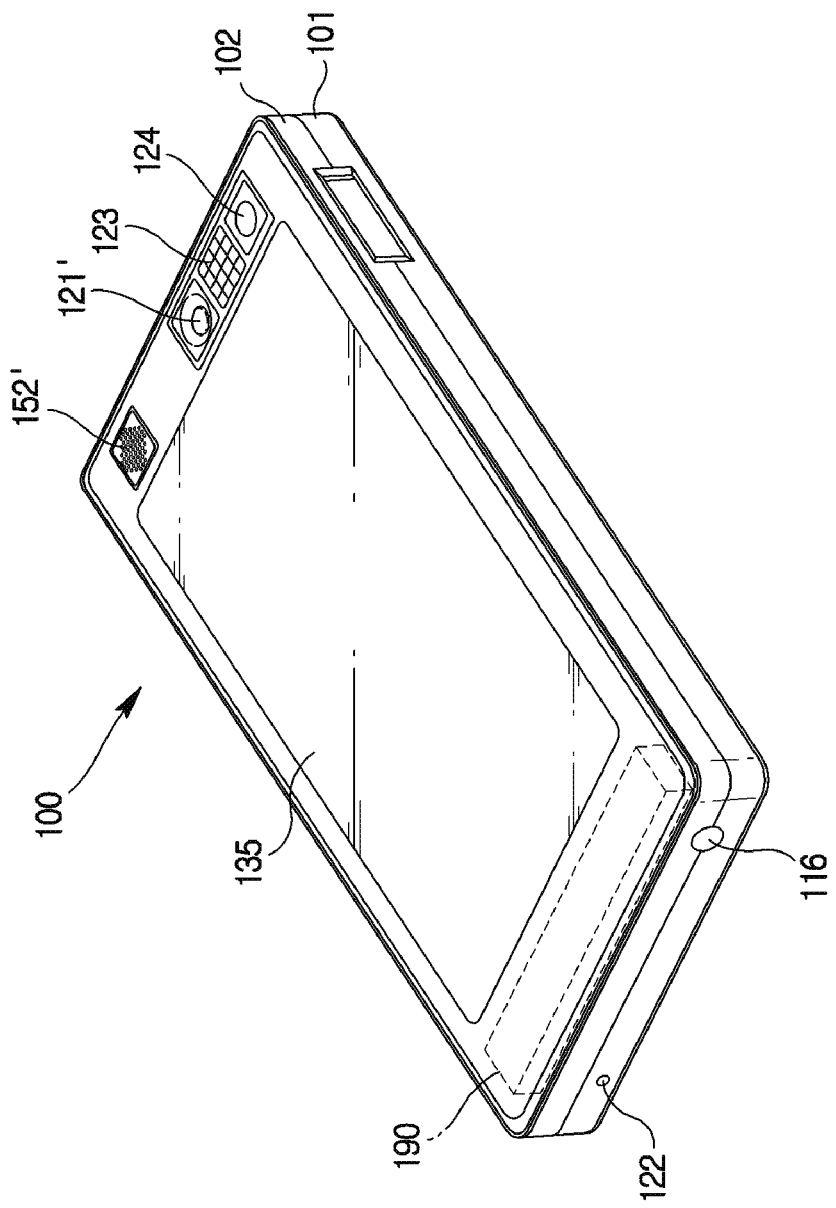

FIG. 2*b* is a perspective diagram of a backside of the mobile terminal shown in FIG. 2*a*. Other embodiments, configurations and arrangements may also be provided.

As shown in FIG. 2*b*, a camera 121' may be additionally provided on a backside of the terminal body, and more particularly on the rear case 102. The camera 121' may have a photographing direction that is substantially opposite to a photographing direction of the camera 121 (shown in FIG. 2*a*) and may have pixels differing from pixels of the camera 121.

For example, the camera 121 may have a lower number of pixels to capture and transmit a picture of user face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2*a* and may be used for implementation of a speakerphone mode in talking over the terminal.

A broadcast signal receiving antenna 116 may be additionally provided at the lateral surface of the terminal body as well as an antenna for communication or the like. The antenna 116 may be considered a portion of the broadcast receiving module 111 shown in FIG. 1 and may be retractably provided on the terminal body.

The power supply unit 190 for supplying a power to the mobile terminal 100 may be provided to the terminal body. The power supply unit 190 may be built within the terminal body. Alternatively, the power supply unit 190 may be detachably and attachably connected to the terminal body.

FIG. 2*b* also shows a touchpad 135 for detecting a touch that is additionally provided on the rear case 102. The touchpad 135 may be configured in a light transmissive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touch screen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or smaller than a size of the display 151.

Now, a method for transmitting a data related to broadcasting contents and a method for displaying the broadcasting contents will be illustrated with reference to FIGS. 3 to 5.

Figure 4:
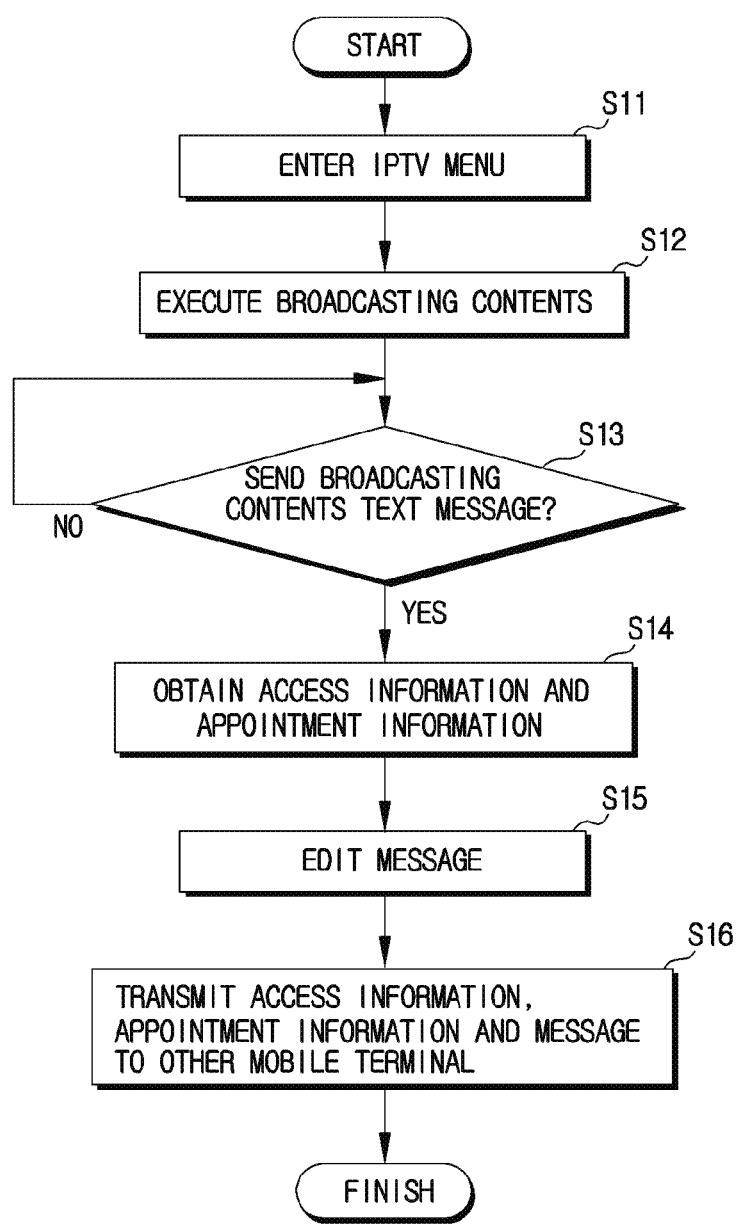
FIG. 4 is a flowchart illustrating a method for transmitting a data related to broadcasting contents of an external server according to an exemplary embodiment of the present disclosure.
Figure 5:
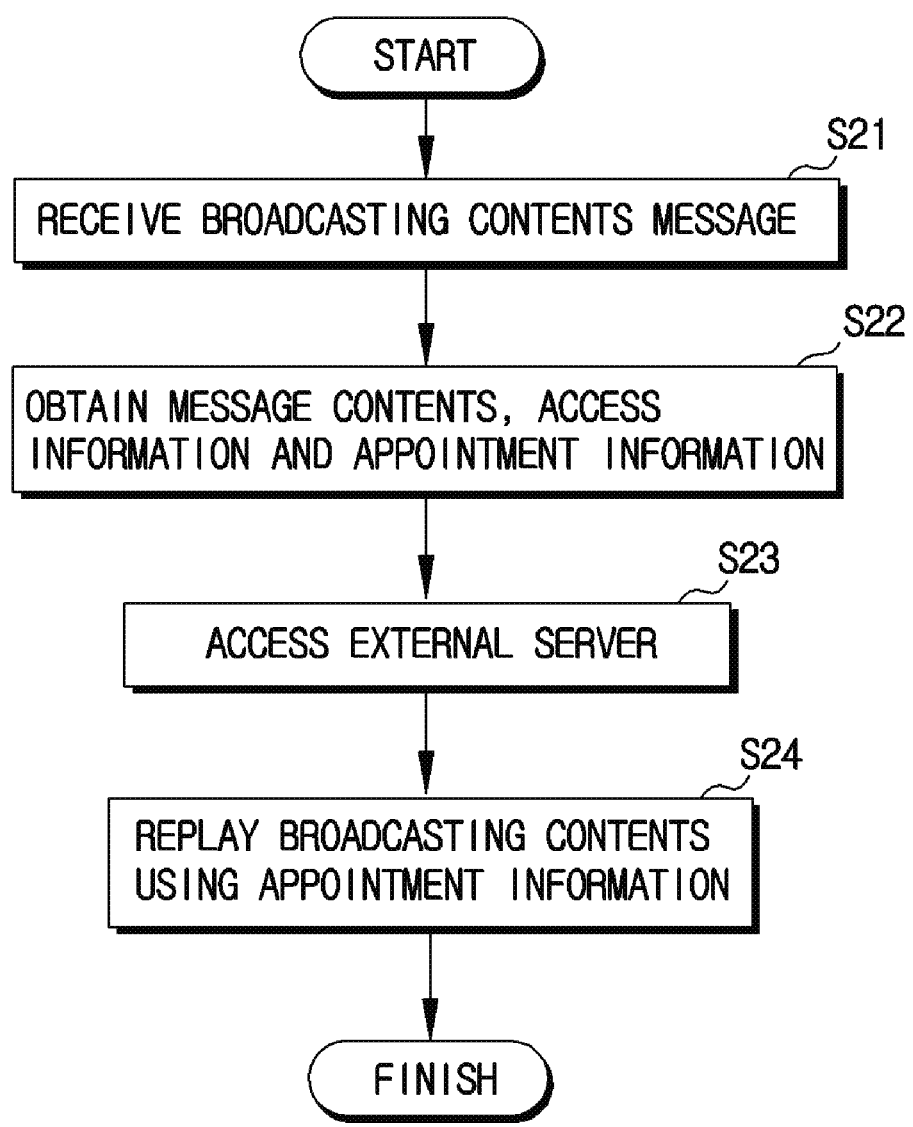
FIG. 5 is a flowchart illustrating a method for displaying broadcasting contents according to an exemplary embodiment of the present disclosure.

FIG. 3 is an overall flowchart illustrating a method for transmitting a data related to broadcasting contents of an external server and a method for displaying broadcasting contents according to an exemplary embodiment of the present disclosure, FIG. 4 is a flowchart illustrating a method for transmitting a data related to broadcasting contents of an external server according to an exemplary embodiment of the present disclosure, and FIG. 5 is a flowchart illustrating a method for displaying broadcasting contents according to an exemplary embodiment of the present disclosure.

Referring to FIG. 3, a transmission terminal (A) may receive broadcasting contents {e.g., VOD (Video on Demand) or IPTV (Internet Protocol TV)} of an external server through its wireless communication unit (S1). Successively, the received broadcasting contents data is displayed on a display unit (S2). Under this state, a user uses the user input unit to edit a broadcasting contents text message and then the text message is transmitted to A reception terminal (B) (S3). The description of editing the broadcasting contents text message will be explained in detail later with reference to FIGS. 4, 6a-6f, and 8.

A reception terminal (B) receives the broadcasting contents text message transmitted from the transmission terminal (A) through its wireless communication unit (S4). The broadcasting contents are displayed on the reception terminal (B) through the user selection of the reception terminal (B) while the text message is being received (S5). At this time, the reception terminal (B) may transmit an acknowledgement (ACK) signal to the transmission terminal (A) (S6).

Now, a detailed operation in the transmission terminal (A) and the reception terminal (B) will be described with reference to FIGS. 4 and 5.

FIG. 4 is a flowchart illustrating a method for transmitting a data related to broadcasting contents of an external server according to an exemplary embodiment of the present disclosure, where the flowchart shows a method that is implemented in the transmission terminal (A).

Referring to FIG. 4, first of all, the user enters an IPTV menu through the user input unit 130 (S11). The IPTV is just an example, and any menu will be sufficient enough as long as broadcasting contents of an external server (Internet server and broadcasting server included) can be viewed. The broadcasting contents of external server may be displayed on the display 151 by selecting the IPTV.

At this time, the controller 180 may decode the received broadcasting contents data and display the data on the display 151 (S12) while the broadcasting contents of external server are received by the wireless communication unit 110.

Under this state, a screen for editing the broadcasting contents text message is displayed on the display 151 by executing a broadcasting contents text message send menu (S13).

In editing the broadcasting contents text message, the controller 180 may automatically obtain an IP address of an external server and an intrinsic ID of the broadcasting contents (i.e., access information) displayed on the display 151 and allow the access information to be included in the broadcasting contents text message.

At this time, the user may select start point information and end point information (hereinafter called "appointment information") of the displayed broadcasting contents, and the appointment information is also included in the broadcasting contents text message (S14). The appointment information may be time information or frame appointment information of the broadcasting contents.

Now, the user may input the text message contents through the user input unit 130 from the broadcasting contents text message send menu. At this time, the text message contents may be inputted using a keypad, and the text message contents may be edited using a handwriting input.

The text message editing may include a telephone number input of the reception terminal (S15). In a case the broadcasting contents text message editing is completed, the completed broadcasting contents text message is transmitted to the reception terminal (S16). The transmitted broadcasting contents text message may include the IP address of an external server appointed by the reception terminal and the intrinsic ID (i.e., the access information), the appointment information and message contents.

Although the IP address of an external server appointed by the reception terminal and the intrinsic ID are used in the present exemplary embodiment, the embodiment is not limited thereto, and a web address of the broadcasting contents may be appointed using the frame information included with the IP address of an external server and the broadcasting contents.

According to the above-mentioned exemplary embodiment, the user may edit part of the broadcasting contents currently being viewed by the user, and transmit the appointment information and the address information of the broadcasting contents to the reception terminal.

FIG. 5 is a flowchart illustrating a method for displaying broadcasting contents according to an exemplary embodiment of the present disclosure.

As illustrated in FIG. 5, the wireless communication unit 110 may receive the broadcasting contents text message generated in the flowchart of FIG. 5 (S21). As shown in FIG. 4, the broadcasting contents text message may include the IP address of an external server and the intrinsic ID of the broadcasting contents (i.e., access information), appointment information and message contents.

The controller 180 may analyze the broadcasting contents text message to obtain the IP address and the intrinsic ID of the received broadcasting contents and the appointment information (S22). Under this state, in a case the user of the reception terminal (B) gives a broadcasting contents display command, the controller 180 may activate the wireless communication unit 110 to attempt to access to the external server, and at the same time, use the IP address and the intrinsic ID of the received broadcasting contents and the appointment information to receive the broadcasting contents appointed by the transmission terminal (A) and to replay the received broadcasting contents (S23, S24).

At this time, broadcasting contents of a particular area may be downloaded using the start information and end information of the appointment information, or the appointment information may be utilized following the receipt of the downloaded overall data of the broadcasting contents to replay the broadcasting contents of the particular area. The appointment information may include scribble information. The editing of the scribble information will be described in detail with reference to FIG. 7. The broadcasting contents may be continuously viewed by the user selection after the end point.

Now, a mobile terminal applied with the method for transmitting broadcasting-related data on the Internet and the method for displaying the broadcasting contents will be described in detail using an image view. Although the following exemplary embodiments may use an IPTV as an example, it is not limited thereto. It should be apparent that the present embodiment may be applied to VOD and broadcasting contents displayed on the Internet.

Figure 9:
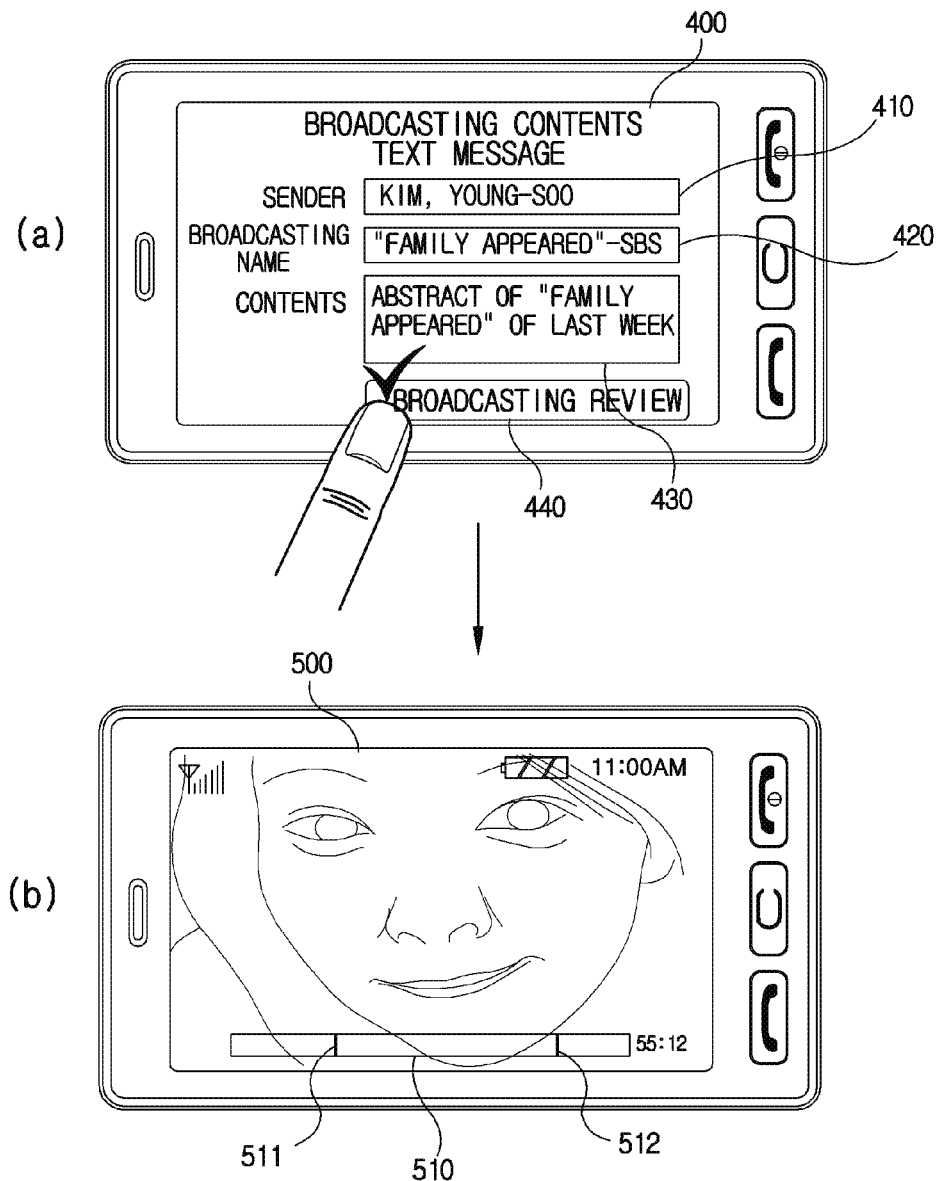
FIG. 9 is an image view of a mobile terminal illustrating a method for displaying broadcasting contents according to an exemplary embodiment of the present disclosure.

FIGS. 6a-6f are an image view of a mobile terminal illustrating a method for transmitting a data related to broadcasting contents of an external sever according to an exemplary embodiment of the present disclosure, FIG. 7 is an image view of a mobile terminal applied with a method for transmitting a data related to broadcasting contents of an external sever according to another exemplary embodiment of the present disclosure, FIG. 8 is an image view of a mobile terminal applied with a method for transmitting a data related to broadcasting contents of an external sever according to still another exemplary embodiment of the present disclosure, and FIG. 9 is an image view of a mobile terminal illustrating a method for displaying broadcasting contents according to an exemplary embodiment of the present disclosure.

Figure 6A:
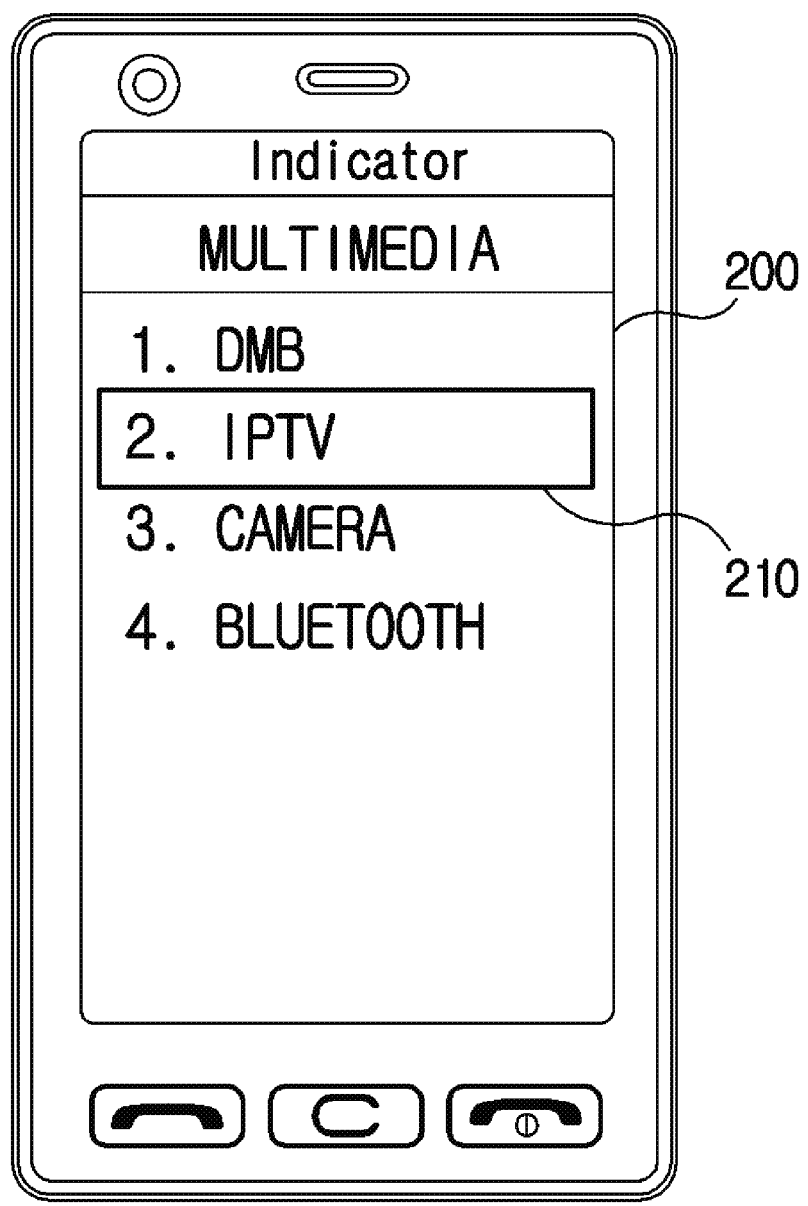

A multimedia menu screen 200 is displayed in FIG. 6a. The multimedia menu screen 200 may include an IPTV menu 210. In a case the user selects the IPTV 210 through the user input unit 130, the controller 180 of the mobile terminal 100 may activate the wireless communication unit 110, and use the pre-set web address of the IPTV and ID information to allow an IPTV broadcasting program on the display.

FIG. 6b illustrates an IPTV program screen 300 on which a progressive bar 310, a menu icon 320 and an end icon 330 are displayed.

The progressive bar 310 serves to notify a program progressive degree of the IPTV broadcasting currently under display and may include an entire program time 315 and a current replay time 317.

Figure 6C:
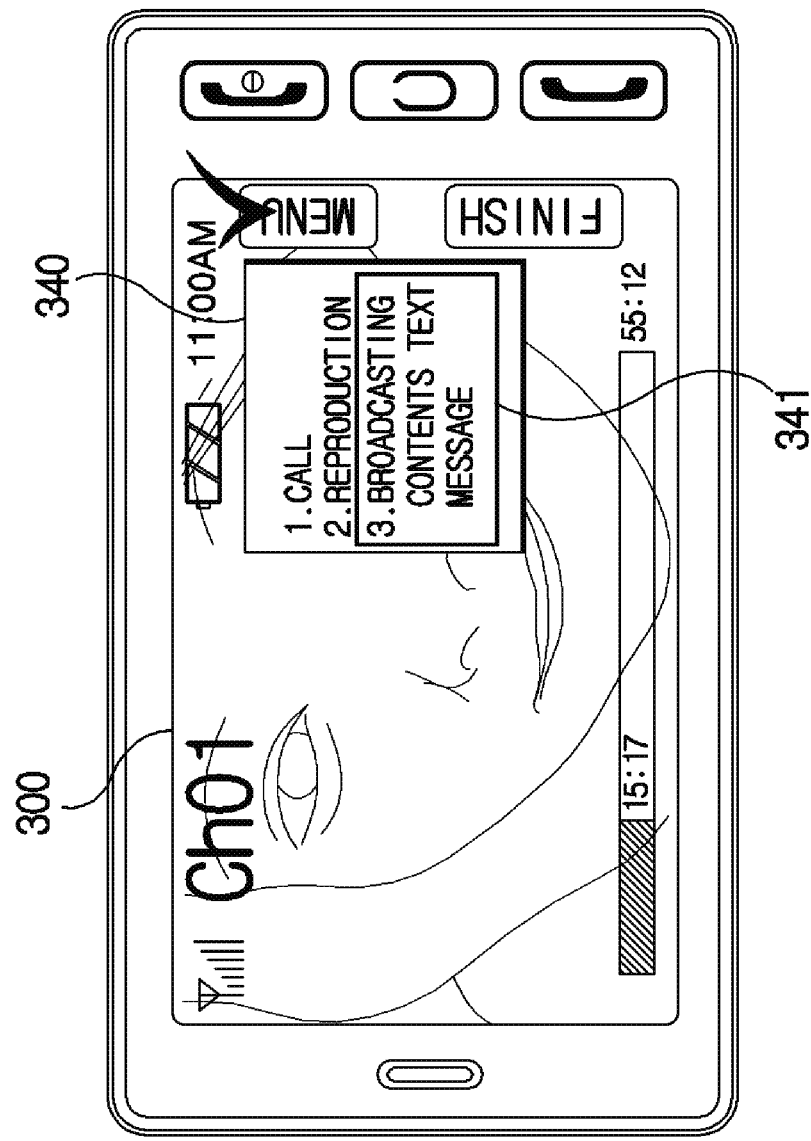

The menu icon 320 may include menus utilizing the IPTV. In a case the user selects the menu icon 320, a menu screen 340 of the menu icon 320 is displayed on the display, as shown in FIG. 6c.

The menu screen 340 may be displayed as a predetermined window type, or an entire screen may be displayed through a screen change. Under this state, in a case the user selects a broadcasting contents text message icon 341, a screen for editing the broadcasting contents text message may be displayed, as shown in FIG. 6d, with a notifying message 350 for inputting broadcasting contents start information and end information, a completion icon 351 and a cancellation icon 352.

Figure 6E:
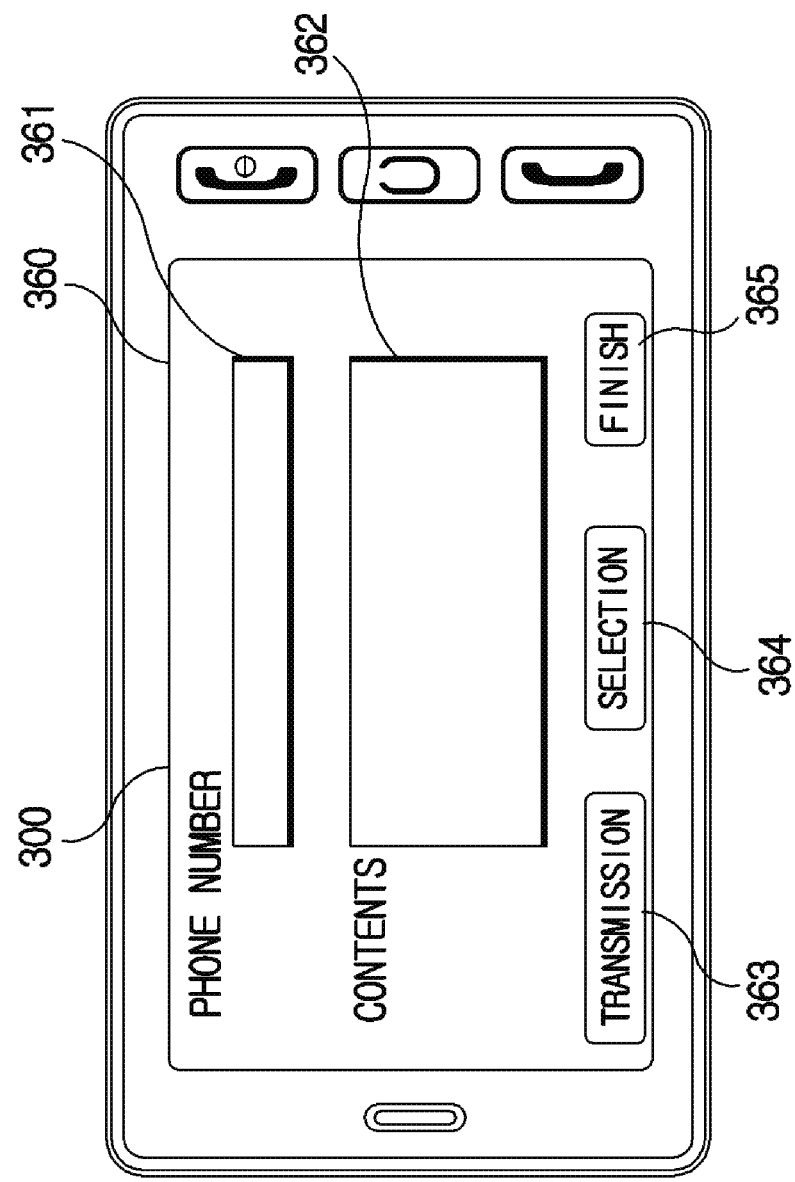

In a case the user uses the progressive bar 310 to select a start point 311 and an end point 312 and selects the completion icon 351, a screen change is made as shown in FIG. 6e. Furthermore, in a case the cancellation icon 352 is chosen, appointment of start point 311 and the end point 312 is cancelled. In a case the start point 311 and the end point 312 are completed in inputting, a text message edit screen 360 displayed on the FIG. 6e is displayed on the display. The text message edit screen 360 may be displayed with a telephone number input window 361, a contents input window 362, a transmission icon 363, a selection icon 364 and an finish icon 365. The text message edit screen 360 may be further displayed with access information and appointment information of the broadcasting contents.

The user may use the user input unit 130 to input the telephone number of the mobile terminal and the text message contents through the telephone number input window 361 and a contents input window 362. If the input of each input window is completed, the selection icon 364 is selected, whereby a cursor position is changed.

Meanwhile, in a case the input of the telephone number of the mobile terminal and the text message contents is completed, and the transmission icon 363 is selected, the controller 180 may transmit the broadcasting contents text message to the reception terminal using the wireless communication unit 110. At this time, the display of the transmission terminal may be displayed with a transmission notifying message 370 as shown in FIG. 6f.

The transmitted broadcasting contents text message may include the access information of the Internet broadcasting contents, appointment information inclusive of the start information and the end information, and text message contents information edited on the text message screen by the user.

FIG. 7 is an image view of a mobile terminal applied with a method for transmitting a data related to broadcasting contents of an external sever according to another exemplary embodiment of the present disclosure, where FIG. 7 is a view illustrating a modification of a method for editing broadcasting contents text message described in FIGS. 6a-6f.

Referring to FIG. 7, an Internet broadcasting contents halted screen 600 may be displayed with first scribble information 610 and second scribble information 620. Now, editing of the scribble information will be described.

First of all, as described in FIGS. 6a-6f, an broadcasting contents is displayed on the display of the mobile terminal. In a case the broadcasting contents under replay is stopped, the halted screen 600 is displayed on the display. Under this state, the user uses the touch of the touch screen or keypad to edit a point on which a scribble is made and a scribble contents (keypad input or handwriting input may be used).

H.264/AVC is adopted in IPTV. Information on resolution of video is included in a sequence parameter set of H.264/AVC. Therefore, in a case the scribble information is edited on the halted screen, and only the scribble information is captured to transmit along with the resolution information, the controller 180 of the mobile terminal may analyze the information to allow the scribble information to be displayed on the same position as that of the scribble information of the transmission terminal. The scribble information is may be external input characters on the halted screen by receiving a determined command of generating a character through a touch screen or a keypad.

In a case the first scribble information 610 and the second scribble information 620 are edited and the broadcasting contents text message is sent, the reception terminal may display the scribble information (610, 620) along with the broadcasting contents.

According to the above-referenced exemplary embodiment, the user can edit the broadcasting contents and his or her comments on the broadcasting contents, and transmit the same to the reception terminal.

FIG. 8 is an image view of a mobile terminal applied with a method for transmitting a data related to broadcasting contents of an external sever according to still another exemplary embodiment of the present disclosure, where FIG. 8 illustrates an example in which a plurality of start information and end information of FIG. 6d is set up.

Referring to FIG. 8, a plurality of start information (311, 311', 311") and end information (312, 312' 312") is set up.

If the plurality of start and end information is set up, a plurality of edited images is continuously displayed on the display of the reception terminal.

FIG. 9 is an image view of a mobile terminal illustrating a method for displaying broadcasting contents according to an exemplary embodiment of the present disclosure, where FIG. 9 is a view for explaining the operation of the reception terminal.

First of all, FIG. 9a illustrates a broadcasting contents text message screen 400. The broadcasting contents text message screen 400 may include a transmitter name block 410, an IPTV broadcasting name block 420, a text message contents block 430 and a broadcasting review icon 440.

The transmitter name block 410 may be displayed with a user name of the transmission terminal or a telephone number. The IPTV broadcasting name block 420 may include a broadcasting contents name of access information included in the broadcasting contents text message. The text message contents block 430 may include a text message contents edited by the transmission terminal.

In a case the user selects the broadcasting review icon 440 through the user input unit 130, the controller 180 may activate the wireless communication unit 110, whereby the IPTV broadcasting program is received using the web information (access information) included in the broadcasting contents text message and is displayed on the display.

At this time, a progressive bar 510 is displayed as shown in FIG. 9b, and a start point 511 and an end point 512 may be displayed on the progressive bar 510 using the broadcasting contents replay start information and the broadcasting contents replay end information included in the broadcasting contents text message.

According to the above-mentioned embodiment, the broadcasting contents are replayed from the start point 511 and are completed in replay at the end point 512. Furthermore, in a case the transmission terminal edits the scribble information and transmits the scribble information to the broadcasting contents text message, the scribble information may be also displayed in reception terminal.

The above-mentioned methods for transmitting broadcasting related data, and displaying the broadcasting contents and the mobile terminal using the same may, however, be embodied in many different forms and should not be construed as limited to the embodiments set forth herein. While particular features or aspects may have been disclosed with respect to several embodiments, such features or aspects may be selectively combined with one or more other features and/or aspects of other embodiments as may be desired.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for transmitting data related to broadcasting contents in a mobile terminal, the method comprising:
displaying a menu on a display unit, the displayed menu configured to initiate receipt of the broadcasting contents in response to a first input received via a user input unit;
receiving the broadcasting contents from an external server;
executing the received broadcasting contents;
displaying the executed broadcasting contents on the display unit;
pausing the display of the broadcasting contents in response to a second input received via the user input unit;
generating a plurality of replay time information, each replay time information including start information and end information for the displayed broadcasting contents;
receiving scribble information via the user input unit;
displaying the received scribble information on the paused display of the broadcasting contents; and
transmitting the displayed scribble information and the plurality of replay time information to another mobile terminal.

2. The method of claim 1, further comprising:
displaying a progressive bar on the display unit, the displayed progressive bar indicating a replay time of the displayed broadcasting contents,
wherein generating the plurality of replay time information includes receiving a plurality of command inputs related to the displayed progressive bar via the user input unit, and generating the plurality of replay time information related to the displayed broadcasting contents in response to receiving the plurality of command inputs.

3. The method of claim 1, further comprising:
generating resolution information related to the broadcasting contents.

4. The method of claim 3, further comprising:
transmitting the generated resolution information with the displayed scribble information.

5. A method for displaying data related to broadcasting contents displayed on a display unit of a mobile terminal, the method comprising:
receiving scribble information and a plurality of replay time information via a wireless communication unit of the mobile terminal, each replay time information including start information and end information of a particular area of the broadcasting contents;
displaying a progressive bar on the display unit, the displayed progressive bar indicating the plurality of particular areas of the broadcasting contents based on the plurality of replay time information;
receiving the broadcasting contents by accessing an external server via the wireless communication unit;
executing the received broadcasting contents; and
replaying the particular areas of the received broadcasting contents on the display unit while displaying the received scribble information on the display unit, such that the replay of the plurality of particular areas is continuous.

6. The method of claim 5, further comprising:
receiving resolution information related to a paused display of the broadcasting contents; and
displaying the executed broadcasting contents according to the received resolution information.

7. A mobile terminal for transmitting data related to broadcasting contents, the mobile terminal comprising:
a wireless communication unit comprising a wireless Internet module and a mobile communication module, wherein the wireless Internet module is configured to access an external server to at least receive the broadcasting contents, and the mobile communication module is configured to at least transmit scribble information;

a display unit configured to display a menu that is configured to initiate receipt of the broadcasting contents when a first input is received via a user input unit of the mobile terminal; and a controller configured to:
- execute the received broadcasting contents,
- control the display unit to display the executed broadcasting contents,
- pause the display of the broadcasting contents in response to a second input received via the user input unit,
- generate a plurality of replay time information, each replay time information including start information and end information for the displayed broadcasting contents,
- receive the scribble information via the user input unit
- control the display unit to display the received scribble information on the paused display of the broadcasting contents, and
- control the mobile communication module to transmit the displayed scribble information and the plurality of replay time information to another mobile terminal.

8. The mobile terminal of claim 7, wherein the controller is further configured to:
- control the display unit to display a progressive bar indicating a replay time of the displayed broadcasting contents,
- generate the plurality of replay time information by receiving a plurality of command inputs related to the displayed progressive bar via the user input unit, and generating the plurality of replay time information related to the displayed broadcasting contents in response to receiving the plurality of command inputs.

9. The mobile terminal of claim 7, wherein the controller is further configured to:
- generate resolution information related to the paused display of the broadcasting contents.

10. The mobile terminal of claim 9, wherein the controller is further configured to control the mobile communication module to transmit the generated resolution information with the displayed scribble information.

11. A mobile terminal for displaying data related to broadcasting contents, the mobile terminal comprising:

a wireless communication unit comprising a wireless Internet module and a mobile communication module, wherein the wireless Internet module is configured to at least access an external server, and the mobile communication module is configured to at least receive scribble information and a plurality of replay time information from another mobile terminal, each replay time information including start information and end information of a particular area of the broadcasting contents;

a display unit configured to display the broadcasting contents; and a controller configured to:
- control the mobile communication module to receive the scribble information and the plurality of replay time information,
- control the display unit to display a progressive bar indicating the plurality of particular areas of the broadcasting contents based on the plurality of replay time information,
- control the wireless Internet module to receive the broadcasting contents by accessing the external server,
- execute the received broadcasting contents, and
- control the display unit to replay the particular areas of the received broadcasting contents while displaying the received scribble information, such that the replay of the plurality of particular areas is continuous.

12. The mobile terminal of claim 11, wherein the controller is further configured to:
- control the wireless Internet module to receive resolution information related to the broadcasting contents, wherein the resolution information is received along with scribble information from other mobile terminals; and
- control the display unit to display the executed broadcasting contents according to the received resolution information.

13. The method of claim 2, wherein the displayed progressive bar indicates the plurality of start and end information.

14. The mobile terminal of claim 8, wherein the progressive bar indicates the plurality of start and end information.

* * * * *